(12) United States Patent
Bonko

(10) Patent No.: US 6,450,221 B1
(45) Date of Patent: Sep. 17, 2002

(54) NON-DIRECTIONAL FARM TIRE

(75) Inventor: Mark Leonard Bonko, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/582,927

(22) PCT Filed: Mar. 17, 1998

(86) PCT No.: PCT/US98/05157
§ 371 (c)(1),
(2), (4) Date: Jul. 5, 2000

(87) PCT Pub. No.: WO99/47368
PCT Pub. Date: Sep. 23, 1999

(51) Int. Cl.$^7$ .................. B60C 11/04; B60C 107/02; B60C 121/00
(52) U.S. Cl. .................. 152/209.12; 152/902
(58) Field of Search .............. 152/209.12, 209.13, 152/902, 209.8

(56) References Cited

U.S. PATENT DOCUMENTS

| | | | | |
|---|---|---|---|---|
| 3,844,326 A | 10/1974 | Verdier | ............ | 152/209 B |
| D256,008 S | 7/1980 | Menin | ............ | D12/147 |
| D260,872 S | 9/1981 | Wright et al. | ............ | D12/146 |
| 4,445,561 A | * 5/1984 | Kono et al. | | |
| D274,232 S | 6/1984 | Kohno et al. | ............ | D12/146 |
| D288,426 S | 2/1987 | Konishi et al. | ............ | D12/147 |
| D303,365 S | 9/1989 | Bonko | ............ | D12/146 |
| D303,366 S | 9/1989 | Bonko | ............ | D12/146 |
| D303,367 S | 9/1989 | Bonko et al. | ............ | D12/146 |
| D303,779 S | 10/1989 | Bonko | ............ | D12/146 |
| D304,320 S | 10/1989 | Bonko | ............ | D12/146 |
| D309,125 S | 7/1990 | Bonko et al. | ............ | D12/151 |
| 4,982,773 A | 1/1991 | Bonko | ............ | 152/209 |
| 4,982,775 A | 1/1991 | Matsumoto | ............ | 152/209 |
| 5,046,541 A | 9/1991 | Bonko | ............ | 152/209 B |
| D329,217 S | 9/1992 | Ota et al. | ............ | D12/146 |
| 5,180,453 A | * 1/1993 | Fukasawa et al. | | |
| D333,453 S | 2/1993 | Cook et al. | ............ | D12/136 |
| 5,421,388 A | * 6/1995 | Bonko et al. | | |
| 5,464,050 A | 11/1995 | Bonko | ............ | 152/209 B |
| 5,901,765 A | * 5/1999 | Bonko | | |
| 6,062,282 A | * 5/2000 | Bonko | | |

FOREIGN PATENT DOCUMENTS

| | | | |
|---|---|---|---|
| DE | 89 07 334 U | | 8/1989 |
| EP | 89320 | * | 9/1983 |
| JP | 3-65409 | * | 3/1991 |
| WO | 98/08697 | | 3/1998 |

* cited by examiner

Primary Examiner—Steven D. Maki
(74) Attorney, Agent, or Firm—David L. King (57) ABSTRACT

A non-directional farm tire 10 has a tread 32. The tread 32 has a set 60 having three lugs 50A, 50B, 50C. The lugs 50A and 50B have substantially parallel lug centerlines 63 while the lugs 50C have centerlines 63 generally perpendicular to the centerline 63 of lugs 50A and 50B. The set 60 is repeated a plurality of times circumferentially about the tread 32. The set 60 extends along a line 62 through the lug centers 61 in a substantially straight line across the tread 32 from the first tread edge 33A to the second tread edge 33B. The centerlines 63 of each of the shoulder lugs are parallel and form an acute angle θ with the equatorial plane of about 45°.

2 Claims, 9 Drawing Sheets

NON-DIRECTIONAL FARM TIRE

BACKGROUND OF THE INVENTION

This invention relates to a non-directional pneumatic agricultural tire for use on farm tractors and similar agricultural type vehicles. Tractor tires must have good vibration characteristics on and off the road while maintaining good traction or drawbar characteristics. Such tires must also provide for the removal of soil, mud, etc., during in-field use.

In the past, agricultural vehicles were horse drawn. With the introduction of motorized tractors in the early 1900's, the farm wheels were made of steel with traction cleats extending across the steel wheel. E. J. Farkas in 1922 patented a detachable tread for tractor wheels. U.S. Pat. No. 1,423,519 describes a rubber tread member that could be added to the steel cleat thus making it possible to cross a road without destroying the paved surface. These historical vehicles were greatly underpowered for the task of farming. Accordingly, the wheels were generally designed to be somewhat, if not entirely, non-directional with cleats inclined or normal to the direction of travel. The non-directional characteristic was helpful when the tractor became stuck In such cases, horses would be hooked to the rear of the vehicle and the tractor with the assistance of added horsepower could reverse itself out of the muck.

As tractor motors improved, the tires became directional in design. The tractor's primary function required forward pulling power and tires were accordingly designed to enhance this feature.

In November 1995, U.S. Pat. No. 5,464,050 issued to Mark Leonard Bonko describing a novel non-directional tread having a set of at least three lugs having substantially parallel lug centerlines oriented at about 45° and lug centers that lie along a substantially straight line across the tread edges.

This tire had lugs of substantially equal lengths and were relatively short when compared to the long bar lugs of the prior art directional tractor tires. The advantage of short lug lengths was greatly improved flexibility resulting in less soil compaction.

While the use of many short lugs has many beneficial features particularly dry traction performance, such a tire has room for improvement.

In particular the tire disclosed in the Bonko patent was best suited for four or more rows of lugs to avoid a low speed lug induced vibration that was evidenced when only three lugs rows were employed. The reason such a phenomena was occurred was related to the fact that as the tire rolled at certain axial locations only the center lug supported the load. On a hard road-like surface at high tire inflation, this makes the tire "duck walk" a term commonly referred to in the tire art. To avoid these phenomena it is desirable to have at least two lugs always contacting the ground in any axial path of the tires contact patch perpendicular to the direction of tire rotation. The Bonko patent requiring the lug centerlines to be parallel prevented or at least greatly limited the three-row lug pattern from achieving this result while still maintaining the open space between lugs for good wet traction. For that reason, Bonko choose a four-row lug pattern as his preferred tire.

That non-directional tire had excellent dry traction with acceptable wet traction. The farmer was very pleased with the ability to have good forward and reverse directional pulling power.

One perceived drawback of the design was that the tire looked slightly unbalanced and that under severe pulling or pushing loads, the tractor may see a sideways slippage. Bonko noted in his earlier patent that a mirror image tire could be made to create offsetting lateral forces to eliminate this concern, if needed. His test data showed an added cost of having both left side and right side tire molds was unnecessary. Nevertheless, to some farmers how the tire looks establishes how the tire will perform. Farmers, maybe more than any other group of tire buyers, are actually as a group very sophisticated and quite adept at understanding how mechanical devices work. They have an on the job engineering sense about them and they tend to network They communicate about what works and what is just a gimmick. They tend to want improved products, but they don't want to risk their livelihood on products that even hint that they don't work. Thus to gain wide acceptance of a new product, the engineers must make a product that looks like it will do the job. The challenge here was to develop a tire that has both actual and perceived advantages.

In DE 89 07 334U discloses an eastmover tire having the features described in the preamble of claim 1.

Bonko in this next generation of non-directional tires set out to increase the lug lengths and open the tread pattern by going to three rows of lugs. The resultant design had to avoid the "duck walk" phenomena, look aggressive and be directional, and provide superior mud traction and at the same time increasing the uniformity of tread wear over his predecessor non-directional tire. The inventive tire described below has exceeded all of the above mentioned design requirements and in very novel way.

SUMMARY OF THE INVENTION

A non-directional pneumatic agricultural tire (20) having a maximum section width (W), an axis of rotation, an equatorial plane perpendicular to the axis, a casing having a carcass (21) reinforced with rubber coated cord, a rubber tread (32) disposed radially outwardly of the carcass is disclosed.

The tread (32) includes an inner tread and a plurality of tread lugs (50A,50B,50C), the lugs respectively have a surface (58) with a length ($l_l$) and a width ($l_w$) defined as the distance between a first edge (52) and a second edge (54) wherein the length ($l_l$) is at least three times the width ($l_w$) and the length ($l_l$) of the lugs (50A,50B,50C) are respectively at least 20% of the maximum section width (W).

Each lug has a centerline (63) defined by a line bisecting the lug surface along the length of the lug.

The tread (32) has a first and a second tread edge (33A,33B) and a net-to-gross ratio, the net-to-gross ratio being defined as the ratio of the surface area of the normally loaded and normally inflated tire tread rubber that makes contact with a hard, flat surface, divided by the area of the tread (32), including non-contacting portions such as grooves as measured around the entire circumference of the tire.

The tread (32) has sets (60) of three lugs, each set having two lugs being shoulder lugs (50A and 50B) having substantially parallel centerlines (63) and one central lug (50C) having a centerline (63) substantially perpendicular to the centerlines (63) of the shoulder lugs (50A,50B). The set (60) is repeated a plurality of times circumferentially about the tread (32). The set (60) extends along a line (63) through the lug centers (61) in a substantially straight line across the tread (32) from the first tread edge (33A) to the second tread edge (33B). The line (62) passing approximately through the center (61) of each lug of a set (60) forms an acute angle θ$_c$ with the equatorial plane of about 45° or more.

The tread (32) is characterized by a net-to-gross ratio of 30% or less, preferably 20% or less wherein the lugs (50A,50B,50C) have a ratio of the lug width (l$_w$) to lug radial height (l$_h$) being less than two-thirds over 70% of the lug length (l$_l$) and the lug (50A) are circumferentially offset relative to the lugs (50B) by a distance X as measured between axial lines (90) tangent to an end (51) of lug (50A) and an axial line (92) tangent to end (51) of lug (50B), X being a circumferential distance of less than the width of the lugs (l$_w$) and wherein the set (60) is oriented such that the axially inner ends (51) of lugs (50A) when extended by the dashed lines to end (53) of lug (50C) creates an asymmetric chevron (70) having an apex (73) and lug (50B) has an end (51) when extended by dashed lines to the end (51) of lug (50C) forms an asymmetric chevron (72) having an apex (74) lying primarily on an opposite tread half and oriented in an opposite direction than the chevron (73).

Each lug centerline (63) of the lugs (50A,50B,50C) are approximated by a line intersecting midway through, thus bisecting halfway between the first edge (52) and the second edge (54) of each lug, the centerline (63) extending parallel to the edges (52) and (54) of each lug. Definitions "Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes toe guards and chaffers, to fit the design rim.

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Design rim" means a rim having a specified configuration and width. For the purposes of this specification, the design rim and design rim width is as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Design rim width" is the specific commercially available rim width assigned to each tire size and typically is between 75% and 90% of the specific tire's section width.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Net-to-gross ratio" means the ratio of the normally loaded and normally inflated tire tread rubber that makes contact with a hard flat surface, divided by the area of the tread, including non-contacting portions such as grooves as measured around the entire circumference of the tire.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Radial" and "radially" means directions radially toward or away from the axis of rotation of the tire.

"Radial-ply tire" means a belted or circumferentially restricted pneumatic tire in which the ply cords, which extend from bead to bead are laid at cord angles between 65° and 900 with respect to the equatorial plane of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire design load" is the base or reference load assigned to a tire at a specific inflation pressure and service condition: other load-pressure relationships applicable to the tire are based upon that base or reference.

"Trailing" refers to a portion or part of the tread that contacts the ground last, with respect to a series of such parts or portions during rotation of the tire in the direction of travel.

"Tread arc width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subjected to any load.

"Tread width," means the arc length of the tread surface in the axial direction, that is, in a plane passing through the axis of rotation of the tire.

"Unit tread pressure," means the radial load borne per unit area (square centimeter or square inch) of the tread surface when that area is in the footprint of the normally inflated and normally loaded tire.

DESCRIPTION OF THE DRAWINGS

The following is a brief description of the drawings in which like parts bear like reference numerals and in which.

DETAILED DESCRIPTION OF THE INVENTION

Figure 4:
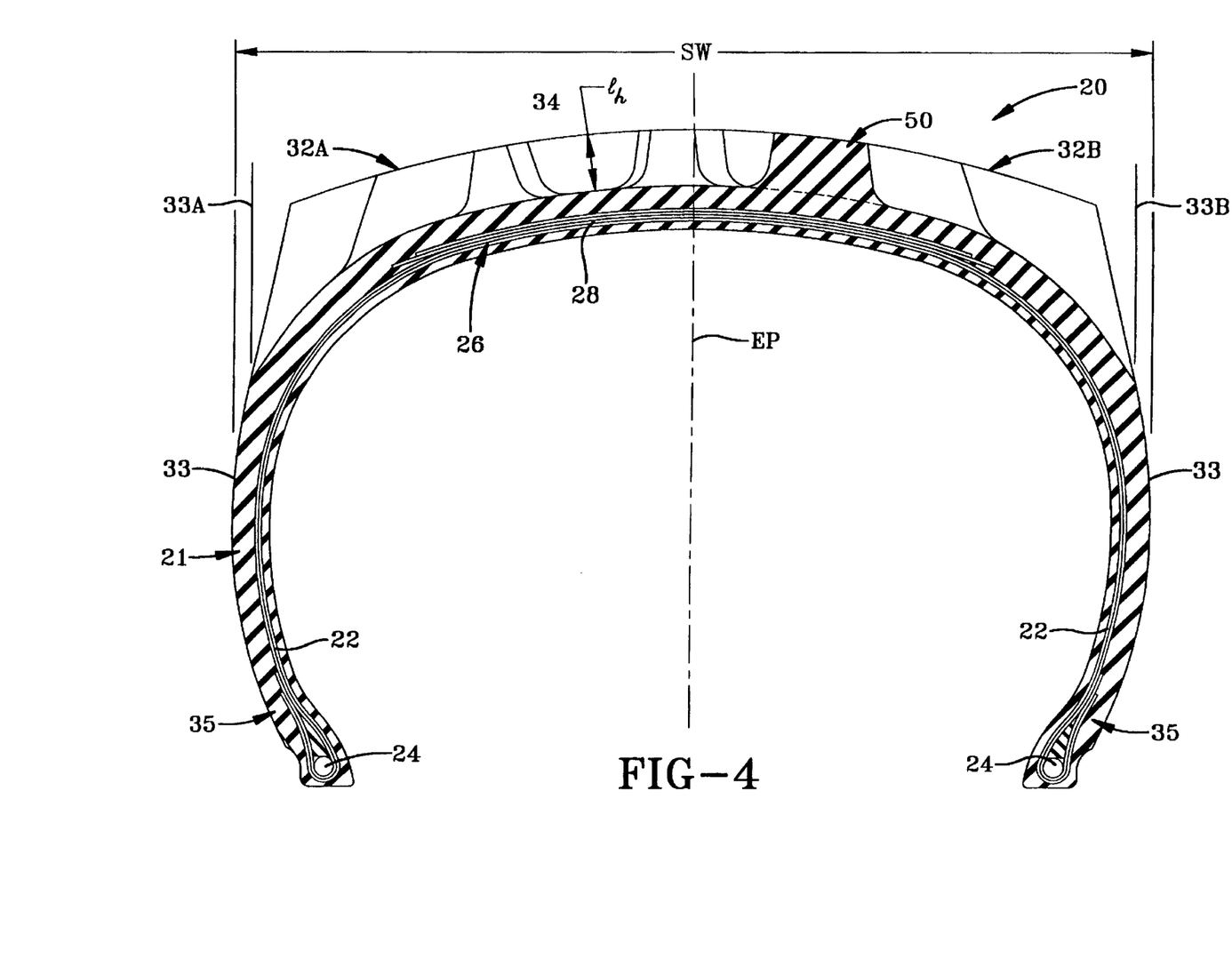
FIG. 4 is a cross-sectional view of the preferred tire taken along lines 4—4 of FIG. 2.

Now referring to FIG. 4, a tire is shown in cross-section view generally as reference numeral 20. The pneumatic tire has a carcass 21 having one or more carcass plies 22 extending circumferentially about the axis of rotation of the tire 20. At least one carcass plies is anchored to a pair of substantially inextensible annular beads 24. A belt-reinforcing member 26 comprising one or more belt plies 28 are disposed radially outwardly from the carcass plies. The belt plies provide reinforcement for the crown region of the tire. A circumferentially extending tread portion 32 is located radially outwardly of the belt reinforcing structure 26.

A sidewall portion 33 extends radially inwardly from each axial or lateral tread edge 33A, 33B of the tread portion to an annular bead portion 35 having the beads 24 located therein.

The carcass plies 22 preferably have textile or synthetic cords reinforcing the plies. The cords are preferably oriented radially. Most preferably, the cords are made of polyester or nylon material. Typically, the tire may have two, three or four plies, each construction increasing in load carry capability as a function of the number of plies.

The belt reinforcement member 26 preferably includes at least two belts reinforced by synthetic cords of rayon or aramid.

Now referring to FIGS. 1–4, a tire 20 according to the present invention is illustrated. The tire 20 according to the present invention has a unique tread 32. The tread 32 has a first tread edge 33A and a second tread edge 33B. Disposed between the tread edges 33A, 33B is an inner tread 34 and a plurality of lugs 50 extending radially outwardly from the inner tread 34.

Figure 1:
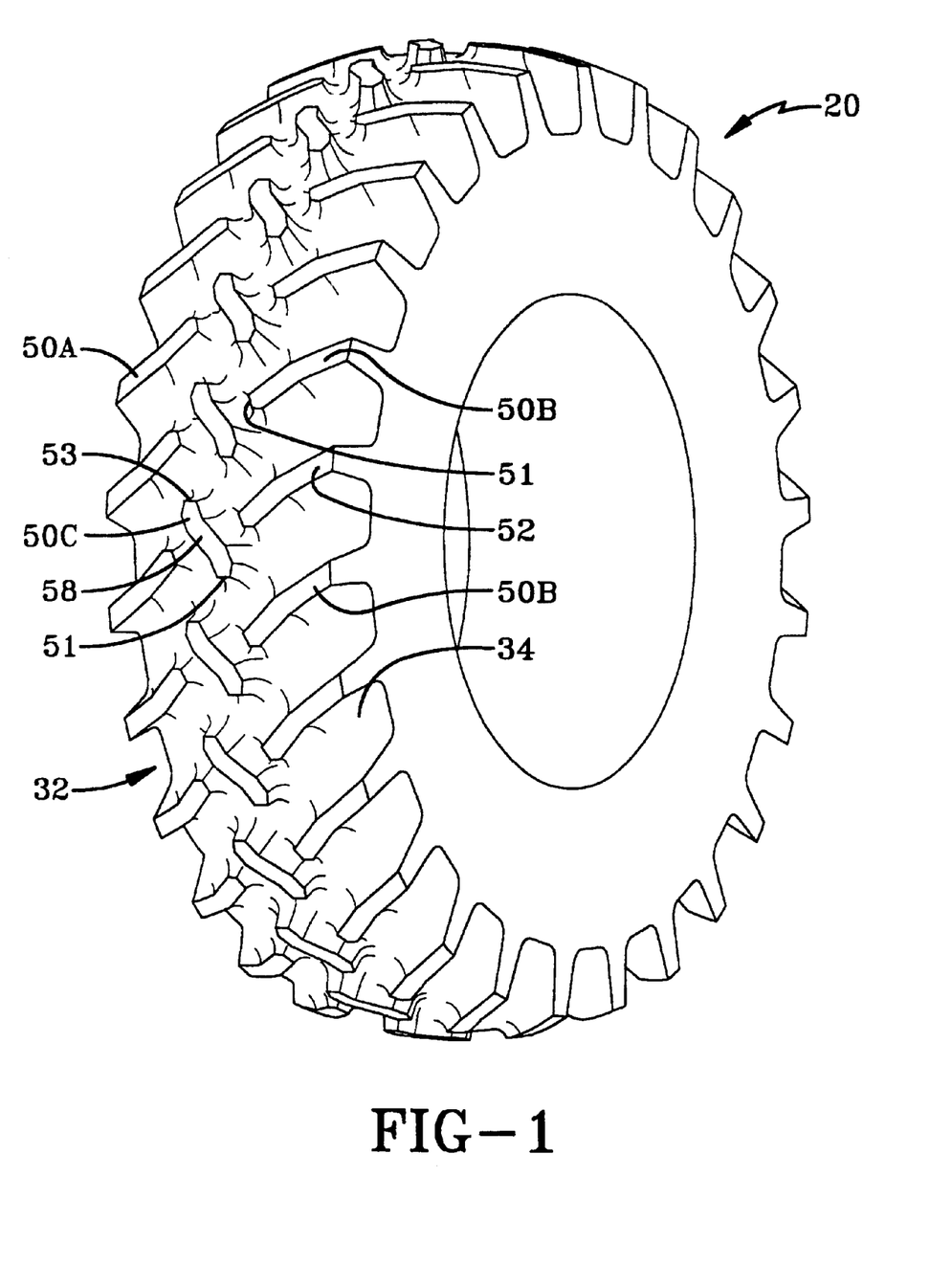
FIG. 1 is a perspective view of a preferred tire according to the present invention.
Figure 2:
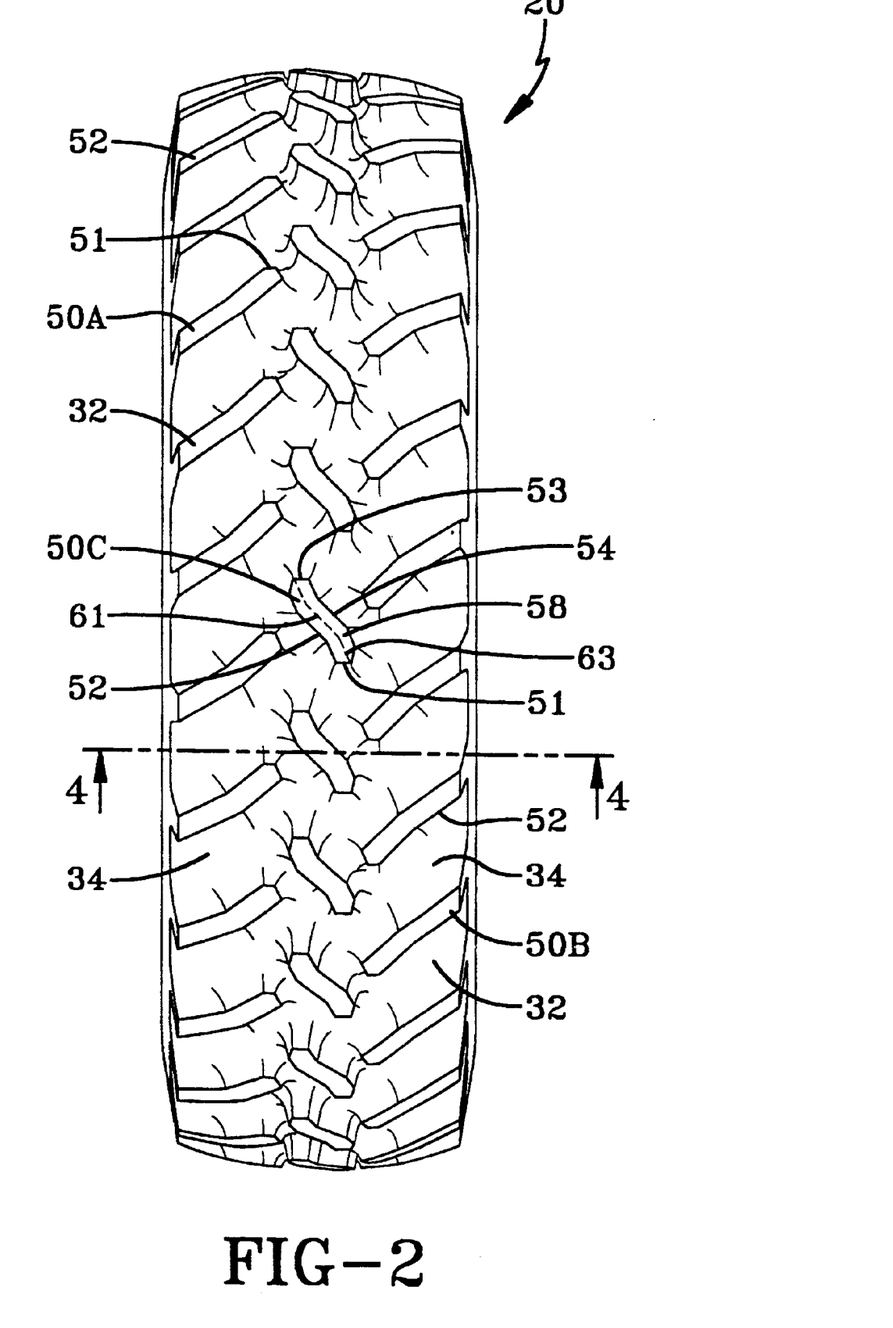
FIG. 2 is a plan view of the preferred tire according to the present invention.
Figure 3:
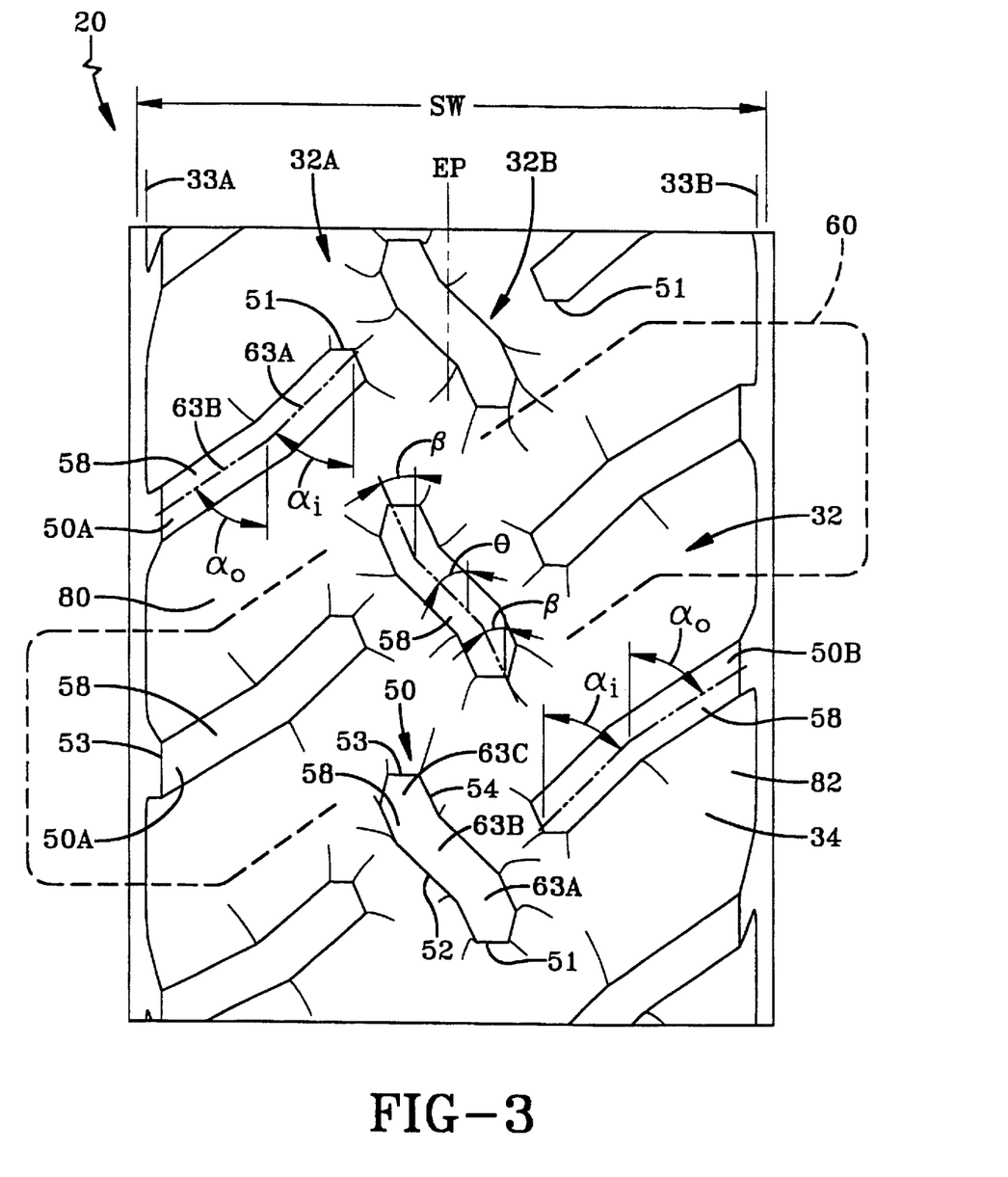
FIG. 3 is a fragmentary view of a tread portion of the preferred tire according to the present invention.

As illustrated in FIG. 3 each lug 50 has a radially outer surface 58, a first edge 52, second edge 54 and a centerline 63 between the first and second edges. Each lug 50 extends generally axially inwardly from an axially outer end 51 to an axially inner end 53.

Figure 5:
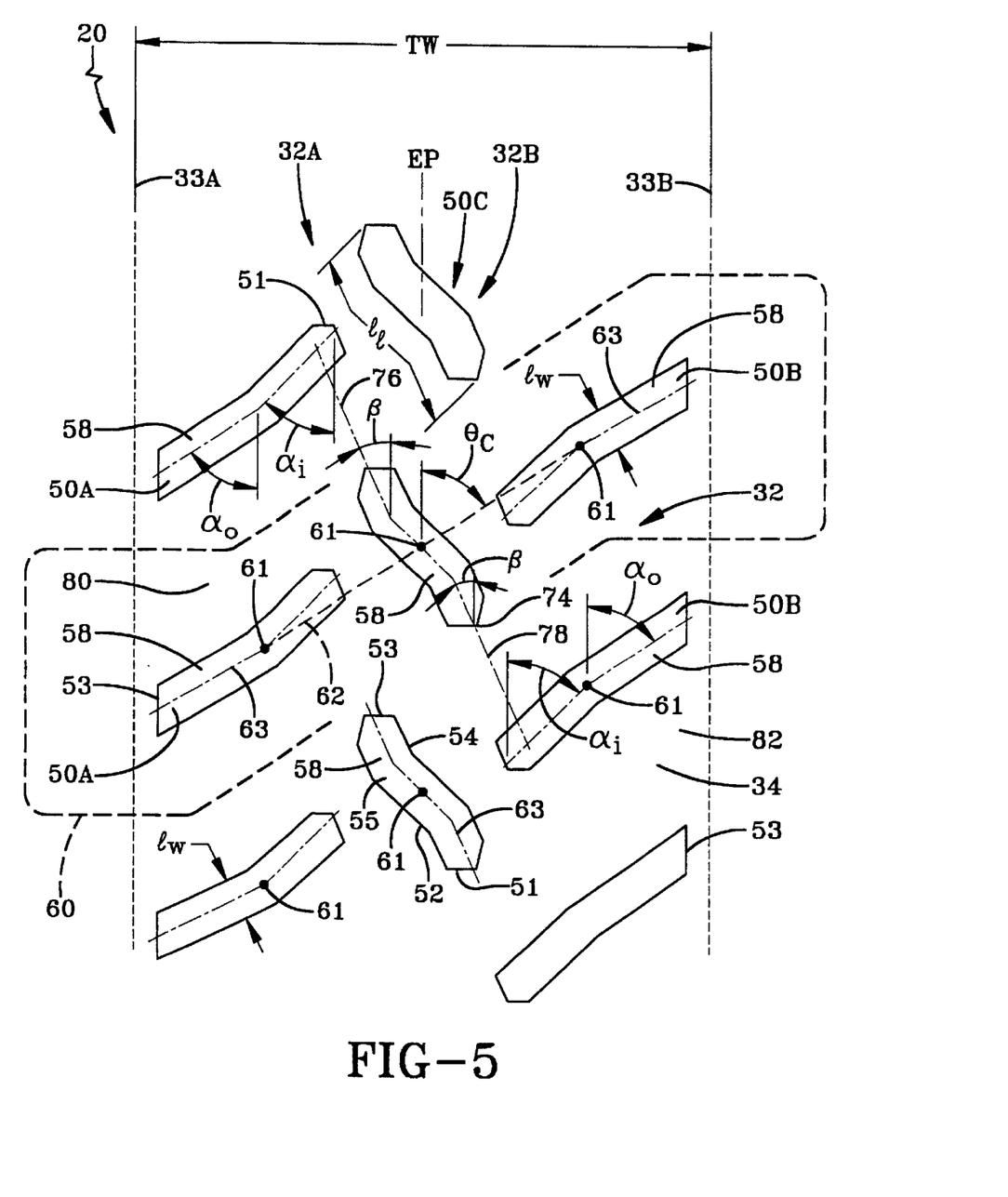
FIG. 5 is a plan view of a portion of the contact patch of the preferred tire according to the invention.

As illustrated in FIG. 5 the radially outer surface 58 when viewed from the contact patch has a polygonal shape. The surface 58 exhibits the approximate orientation of the lug 50. For purposes of this invention the centerline 63 of the lug 50 is approximated by a line intersecting midway through, thus bisecting the first and second edges 52 and 54, the line extending parallel to the edges 52 and 54 of the lug 50. Each lug 50A, 50B, 50C has a lug center 61. The lug centers 61 lie in a substantially straight line 62, the straight line 62 being oriented at an angle $\theta_c$ of 45° or more relative to the equatorial plane.

As shown in FIG. 3, the preferred embodiment tire 20 has the shoulder lugs 50A and 50B similar in shape and reversed in orientation such that each lug centerline has an axially inner segment 63A and an axially outer segment 63B. The axially inner segment of lug 50A is oriented at an angle of $\alpha_I$ relative to the equatorial plane while the axially outer portion is inclined at an angle $\alpha_o$, $\alpha_o$, being greater than $\alpha_I$ of lug 50A and wherein the shoulder lug 50B has the same angles $\alpha_I$ and $a_o$ of the centerline segments 63A and 63B. This same angle centerlines is a feature of a nondirectional tread. Whereas the angles of the shoulder lugs of a direction tread are oppositely oriented relative to the equatorial plane from one tread edge to the other.

The center element first end 51 and opposite end 53 are similarly inclined along the lug 50C centerline 63A and 63C at an angle $\beta$ whereas the center portion 63B of the lug has the centerline 63B oriented at an angle $\theta$ of about 45° while $\beta$ is inclined at 30° or less. The center 61 of the lug 50C is at or near the equatorial plane, preferably at the equatorial plane. A line 62 drawn through the centers 61 of lugs 50A and 50B is in close proximity to the center 61 of lug 50C, preferably intersecting the line 62.

While certain modification lug locations in angular orientations are contemplated, it is believed most preferable that the adjacent center elements 50C all have the same orientation and that the centers of these lugs 50C all lie on the equatorial plane. This orientation is believed to allow for very long shoulder lugs 50A and 50B, each shoulder lug having the same lug length. This greatly enhances uniform lug wear.

It is important to note that lugs have a length at least three times the width of the element whereas block elements have a width greater than one-third the length of the element. A lug for purposes of this invention has a length at least 20% of the section width of the tire.

The distance along the centerline 63 between the axially outer and inner ends 51,53 defines the length ($l_l$) of the lug 50.

The distance extending substantially perpendicularly between the first and second edges 52,54 of the lug define the lug width ($l_w$). The radial distance extending between the inner tread 34 and the edges 52,54 of the lug 50 defines the radial lug height ($l_h$). The ratio of the lug width ($l_w$) to lug radial height ($l_h$) is less than two-thirds over at least 70% of the lug length ($l_l$).

In the illustrated preferred embodiment of the invention as shown in FIGS. 1–4 the lugs 50 are arranged in a set 60 of three lugs 50A, 50B and 50C. Within each set 60 as illustrated each lug 50A and 50B is oriented substantially parallel to one another, the lugs 50A and 50B being adjacent to a tread edge 33A, 33B lug being positioned between lugs 50A and 50B. Lug 50C intersects the equatorial plane. Lugs 50A and 50B are substantially equal in length and shown has a compound shape greater in length than lugs 50B and 50C.

Figure 6A:
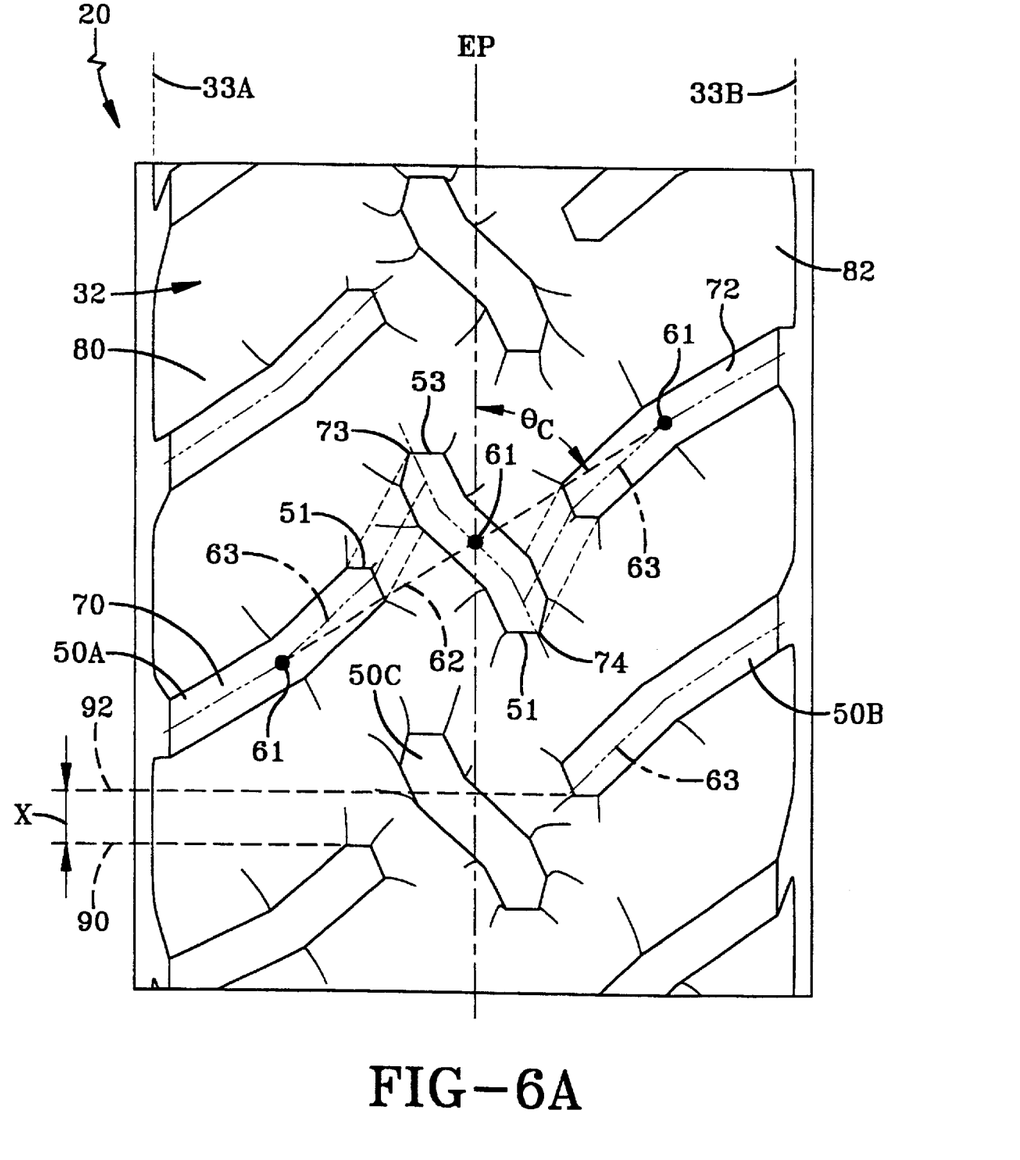
FIG. 6A is a fragmentary plan view of a portion of the preferred tire according to the present invention.

The lugs 50C as shown are oriented generally perpendicular to the shoulder lugs 50A and 50B. As illustrated in FIG. 6A, the lugs 50A extending from tread edge 33A are circumferentially offset relative to the lugs 50B extending from tread edge 33B by a distance of X, X being the distance between axial dashed line 90 tangent to end 51 of lug 50A and axial dashed line 92 tangent to end 51 of lug 50B. Preferably, the distance X is kept to a minimum in order to avoid the low speed lug induced vibration problem previously discussed. As one can readily observe the center lug 50C traverses the distance X and provides a second lug to stabilize the load. Preferably X is held at a circumferential distance equal to less than the width of the lugs $l_w$.

An unusual but extremely beneficial feature of the lug set 60 orientation is that the axially inner ends 51 of lugs 50A when extended by the dashed lines to end 53 of lug 50C as shown in FIG. 6A creates an assymentic chevron 70. Similarly lug 50B has an end 51 that when extended by dash lines to end SI of lug 50C creates an asymmetric chevron 72 lying primarily on an opposite tread half and oriented in an opposite direction. The apex 73, 74 a chevron are a common feature found in a directional tread for a farm tire. Generally the use of long bars that cross the equatorial plane of a tractor tire have chevrons that all point in the same direction with apexes that either all lie on the equatorial plane or alternate on each side of the equatorial plane very close to the tread center. The apex of the chevron provides a point for the lug to penetrate into the soil. The tire of the present invention has these features wherein half of the chevrons 70 all face in one direction and are located closer to one tread edge 33A and the other half of the chevrons 72 all face in an opposite direction and are closer to the opposite tread edge 33B. This feature enhances soil penetration regardless of the direction of travel.

Figure 6B:
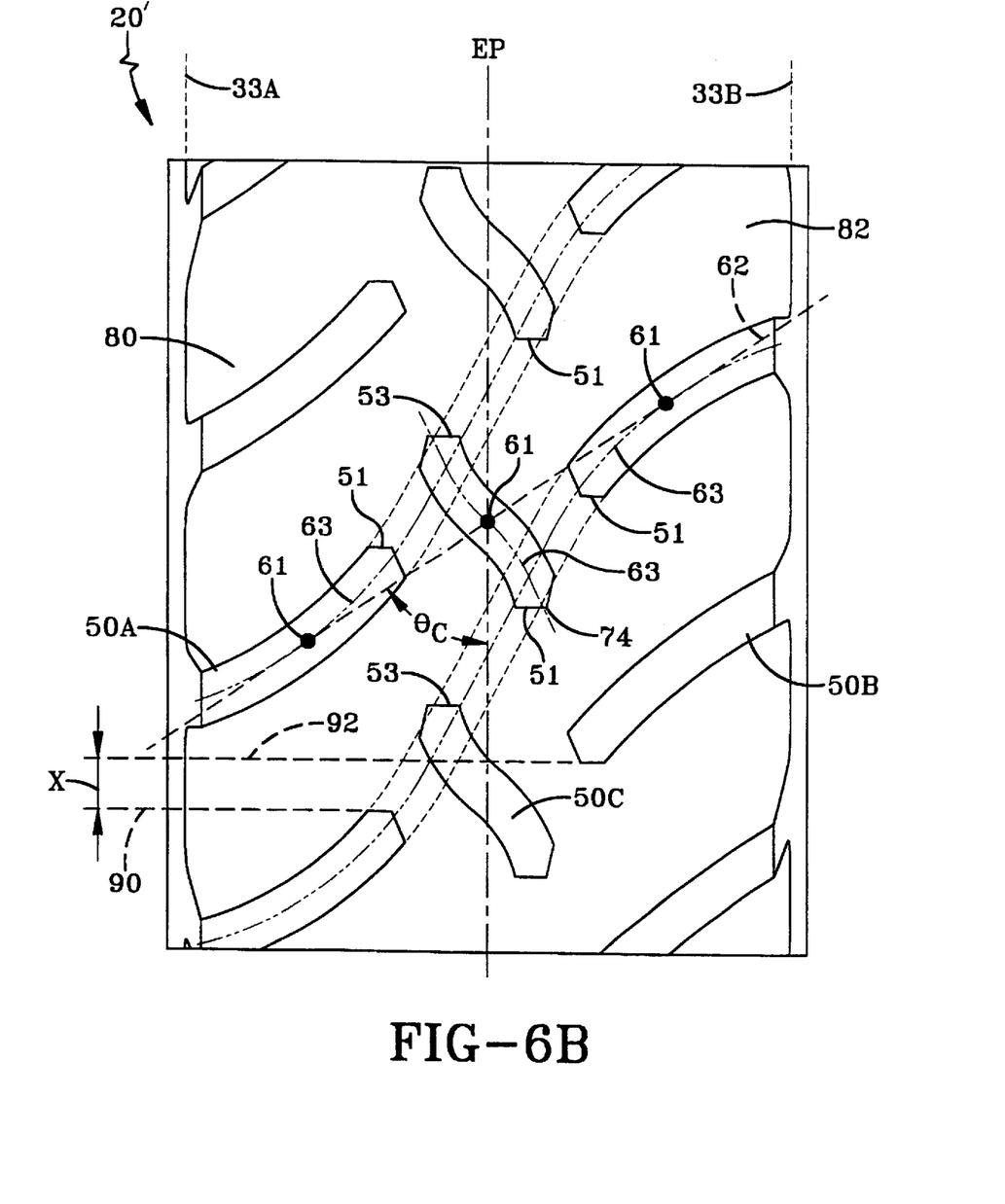
FIG. 6B is a similar view of an alternative embodiment three lug set.

FIG. 6B illustrates an alternative curvilinear lug design of the present invention. While the pattern is functionally the same as the tread shown in FIG. 6A, the depiction of dash lines show that the lug pattern creates a somewhat elongated "S" shape as it diagonally crosses the tread width wherein lugs 50A of one set 60 and 50B of a circumferentially adjacent set 60 and the resultant path occupy or cross a leading and trailing end of two central lugs 50C of adjacent sets. This subtle feature while not readily apparent in FIG. 6A becomes more apparent in FIG. 6B due to the dashed lines. The lugs 50A, 50B and 50C are arranged to create large soil discharge channels 80, 82 with the central lugs 50C working in tandem or pairs creating a flow restrictor or darn to help force the soil or mud to flow out or over the shoulder of the tread. This soil flow pattern occurs naturally in the channels 80 or 82 adjacent the lugs having the apex 73, 74 being pointed in the direction of vehicle travel, but on the side wherein the apex is opposite to the direction of travel part of the flow wants to go into not out over the shoulder. The central lug 50C greatly restricts this tendency helping to create a back pressure forcing mud to properly expel over a shoulder even though the chevron is oppositely oriented. This feature of flow restriction across the tread centerlines helps prevent or minimize the sideways slip under severe pulling loads in very wet soil.

Figure 7A:
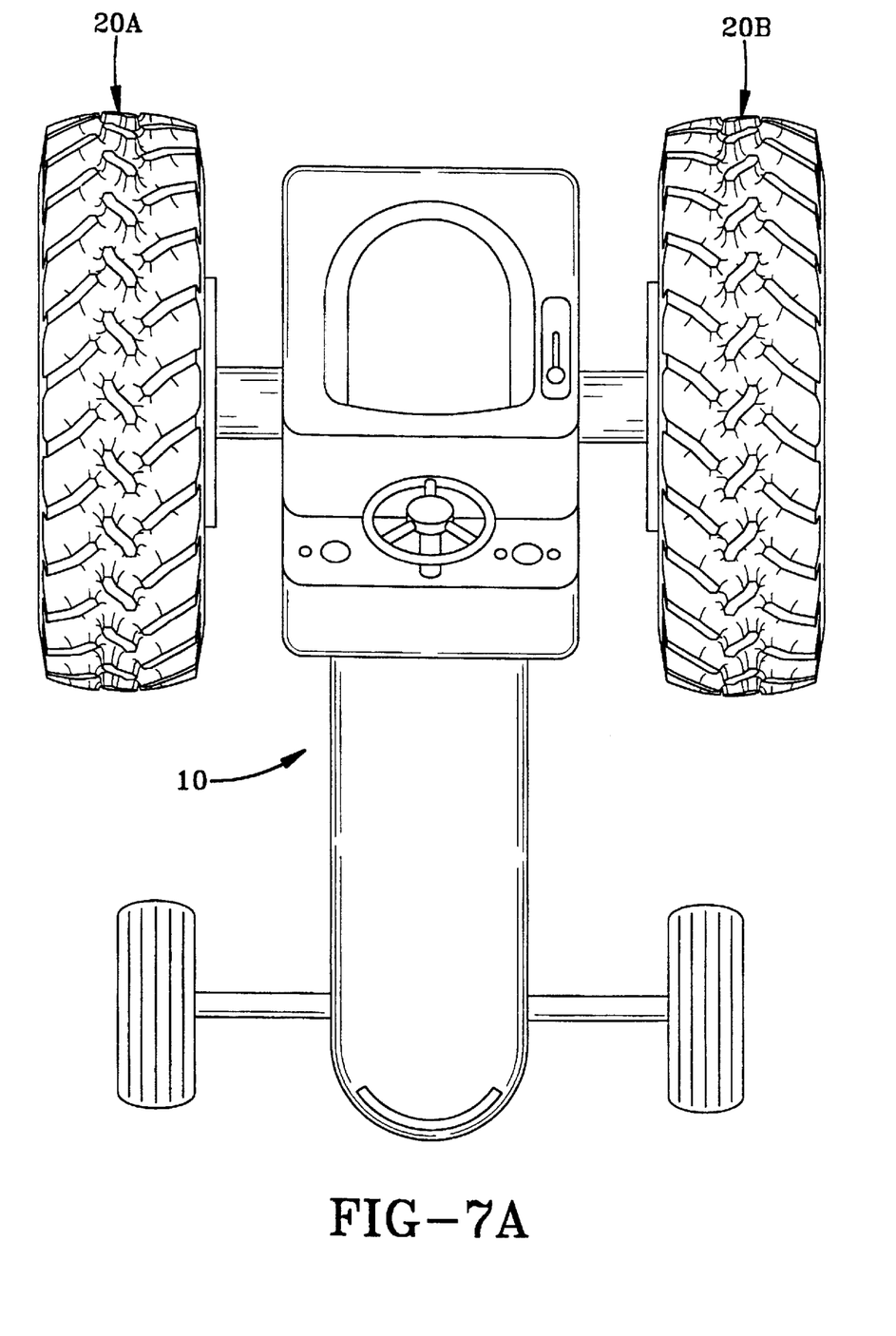
FIG. 7A is plan view of the tire according to the present invention mounted on a tractor, tire 20A being a mirror image tire relative to tire 20B.
Figure 7B:
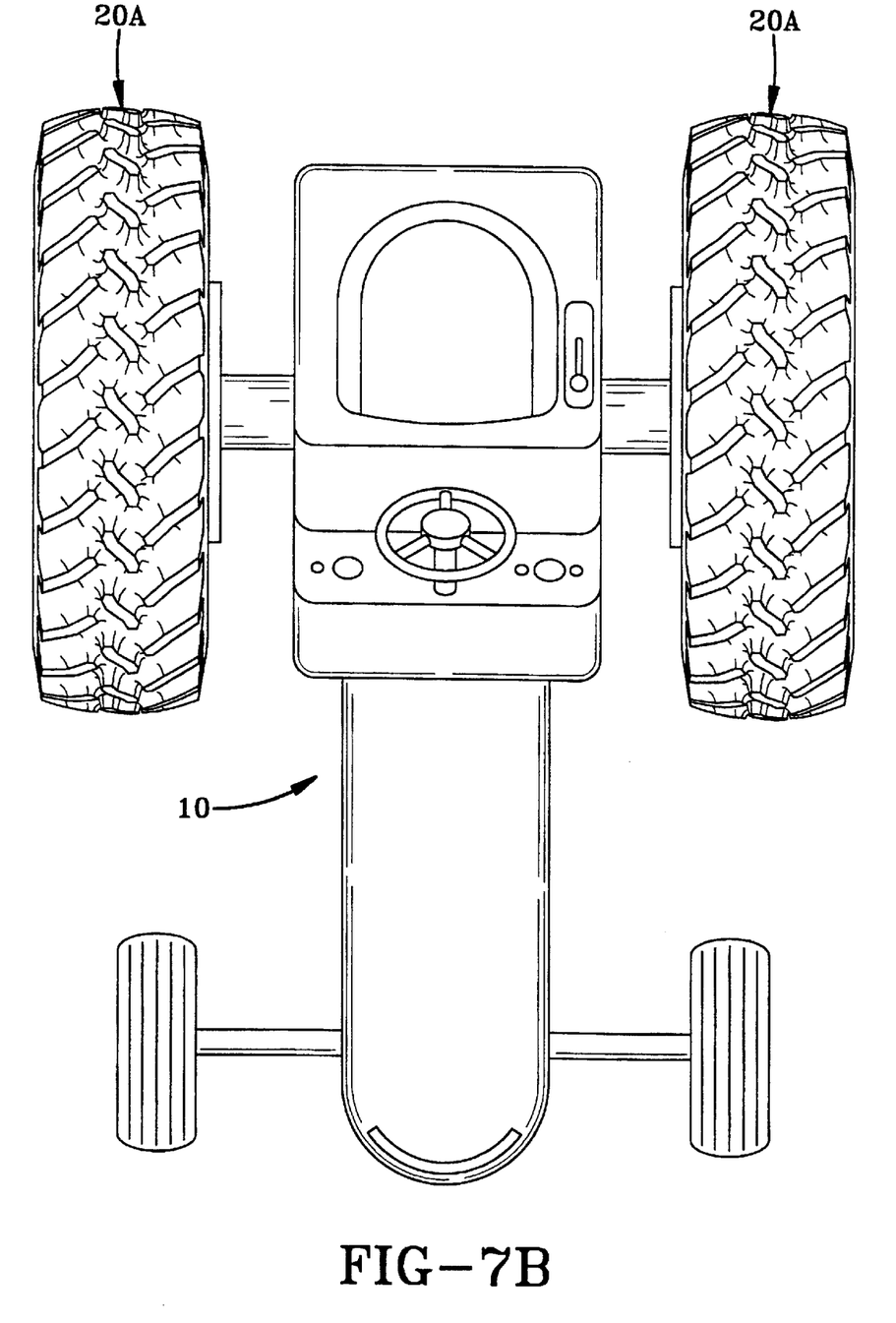
FIG. 7B is a similar view showing a single tire 20A mounted on a tractor.

This channeling of soil achieves the desired balancing of forward and reverse traction performance and equally if not more significantly, creates the perception of good performance in the farmer's mind. To get this point across, FIG. 7A shows tire 20A and its mirror image tire 20B mounted on a tractor such a configuration requires two molds to make a left side and a right side tire. In FIG. 7B only tire 20A is used on both wheel positions as can be seen the tire according to the invention has a very balanced appearance when only one mold is used. The inventive tire simply looks like it will work and that it will work in either direction of travel equally well. The farmer sees it and knows it should perform.

A point that isn't so apparent is that the tire of the present invention not only works well, it is less expensive to fabricate its molds. Only one-half of the mold need to be modeled. The tread casting on one tread half when flipped over is the same as the opposite tread half, a significant advantage when building a non-directional tread pattern of three rows of lugs. Thus, the tread pattern as depicted can be modeled and molds made in significantly reduced time resulting in less expensive tooling.

The tire of the present invention has shoulder lugs 50A and 50B of a length much greater than was practical in the earlier Bonko non-directional tire. The increased lug length increases the surface area between the inner tread and the lug edge 52 or 54. In very wet soils. the lugs leading edge surfaces act as paddles and these paddles propel the vehicle. Short lugs simply allow the flow to by-pass around the lug losing much of the propulsion forces to enable the vehicle to traverse the wet spot. The farmers use especially deep lug R-2 tires commonly referred to as Rice Cane tires for such conditions. While the tire of the present invention was designed to be an R-1 lug depth tire, it can easily be appreciated that the more open pattern permits lugs of up to R-2 in depth to be employed.

Another added benefit of the three rows of lugs 50A, 50B, 50C of the present invention is that the design is compatible with a new patented variable pitching technique to further reduce lug induced vibrations common in single pitched farm tires. That patent is U.S. Pat. No. 5,733,394 assigned to The Goodyear Tire & Rubber Company.

While non-directional farm tires were considered a serious compromise sacrificing the superior forward drawbar performance of directional tires for some improved reverse traction. The present invention is closing the drawbar performance gap. For the applications where the vehicle must exhibit good forward and reverse drawbar traction, a non-directional tire is essential. For many farmers the tractor is a multipurpose vehicle sometimes pulling a plow sometimes a front-end loader or scoop. The first case needed only forward traction while the second case needs both forward and reverse traction. A tire that can do both jobs well is clearly superior to farmers than a one directional tire. The applications requiring bi directional traction are increasing. The tire 20 of the present invention is, for the reasons stated above, the best non-directional tire for particularly wet or sloppy soil conditions without sacrificing dry soil performance.

What is claimed is:

1. A non-directional pneumatic agricultural tire having a medium section width (W), an axis of rotation, an equatorial plane perpendicular to the axis, a casing having a carcass reinforced with rubber coated cord, a rubber tread disposed radially outwardly of the carcass, the tread including an inner tread and a plurality of tread lugs, the lugs respectively having a surface with a length ($l_l$) and a width ($l_w$) defined as the distance between a first edge and a second edge wherein the length ($l_l$) is at least three times the width ($l_w$) and the length ($l_l$) of the lugs being respectively at least 20% of the maximum section width (W), each lug having a lug center, the tread having a first and a second tread edge and a net-to-gross ratio, the net-to-gross ratio being defined as the ratio of the surface area of the tread rubber that makes contact with a hard, flat surface when the tire is normally loaded and normally inflated, divided by the area of the tread, including non-contacting portions as measured around the entire circumference of the tire, the tread having sets of three lugs, each set comprising a first shoulder lug and a second shoulder lug having substantially parallel lug centerlines, and one central lug having a centerline substantially perpendicular to the centerlines of the shoulder lugs, the set being repeated a plurality of times circumferentially about the tread, the set extending along a line approximately through the lug centers of the lugs of the set in a substantially straight line across the tread from the first tread edge to the second tread edge, the line passing approximately through the center of each lug of the set forming an acute angle $\theta_c$ with the equatorial plane of about 45° or more, the tread being characterized by a net-to-gross ratio of 30% or less wherein the lugs have a ratio of the lug width ($l_w$) to lug radial height ($l_h$) being less than two-thirds over at least 70% of the lug length ($l_l$) and the first shoulder lugs are circumferentially offset relative to the second shoulder lugs by a distance X as measured between an axial line tangent to end of the first shoulder lug and an axial line tangent to end of the second shoulder lug, X being a circumferential distance of less than the width of the lugs ($l_w$) and wherein the set is oriented such that the axially inner ends of the first shoulder lugs when extended by the dashed lines to an end of the center lug creates an asymmetric chevron having an apex and the second shoulder lug has an end when extended by dash lines to the other end of the center lug forms an asymmetric chevron having an apex lying primarily on an opposite tread half and oriented in an opposite direction than the chevron, and each lug centerline of the lugs are approximated by a line intersecting midway through, thus bisecting halfway between the first edge and second edge, the centerline extending parallel to the edges of each lug.

2. The non-directional tire of claim 1 wherein the net-to-gross ratio is 20% or less.

* * * * *